J. MACESKA.
AUTOMOBILE LOCK.
APPLICATION FILED MAR. 12, 1920.

1,361,391.

Patented Dec. 7, 1920.

Inventor
J. Maceska

By A. M. Wilson

Attorney

UNITED STATES PATENT OFFICE.

JOSEPH MACESKA, OF YANKTON, SOUTH DAKOTA.

AUTOMOBILE-LOCK.

1,361,391. Specification of Letters Patent. Patented Dec. 7, 1920.

Application filed March 12, 1920. Serial No. 365,218.

*To all whom it may concern:*

Be it known that I, JOSEPH MACESKA, a citizen of the United States of America, residing at Yankton, in the county of Yankton and State of South Dakota, have invented certain new and useful Improvements in Automobile-Locks, of which the following is a specification.

This invention relates to certain new and useful improvements in automobile locks particularly adapted for locking the foot levers of the well known "Ford" automobiles, which control the clutch, reverse and brake, in such position as to render unlikely the possibility of an unauthorized person starting and running the machine.

The principal object of the present invention is to provide an automobile lock of simple but durable construction for effectively locking the above mentioned foot levers in forwardly swung position wherein the brake is applied, the reverse gear is active and the forward gear is in "low." When the foot levers are locked in this position there is a conflict of gearing by reason of the fact that the forward gears are active in low and the reverse gears are also active. Additionally, the brakes are applied, and it will thus be seen that the device will lock the levers in such position as to prevent unauthorized use of an automobile.

With the above general objects in view and others that will appear as the nature of the invention is better understood, the same consists in the novel form, combination and arrangement of parts hereinafter more fully described, shown in the accompanying drawing and claimed.

Figure 1:
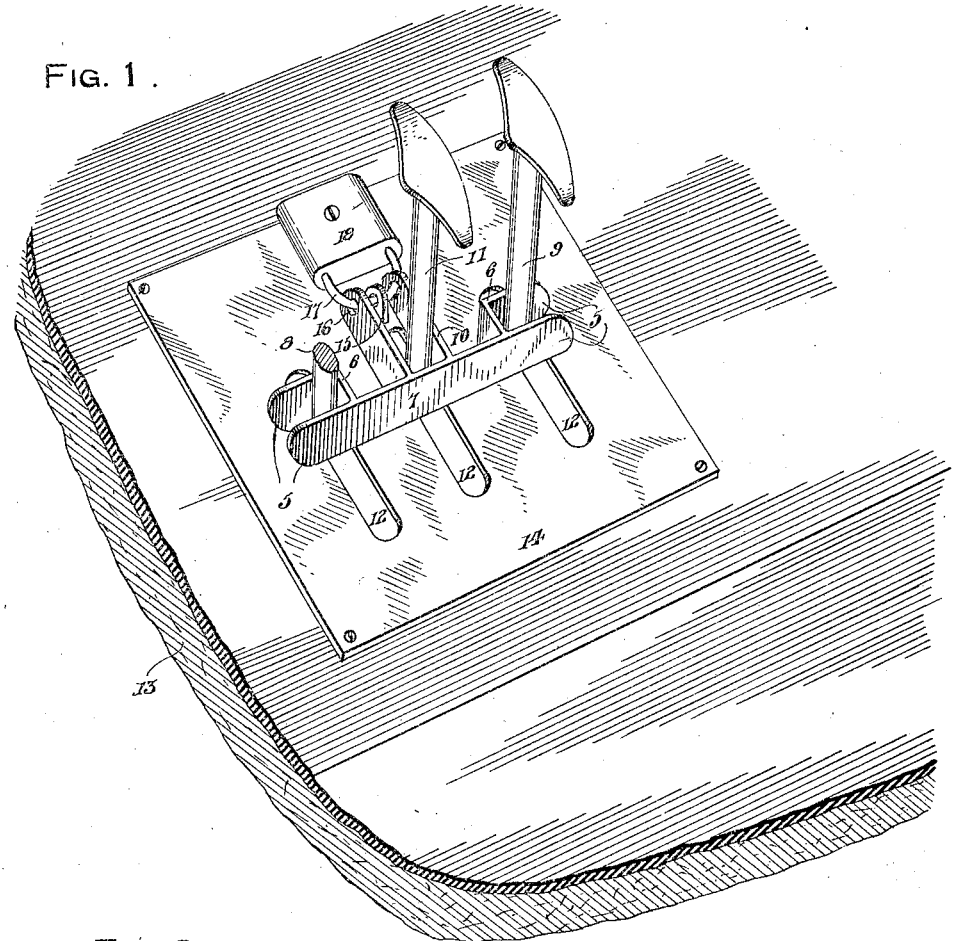
Figure 2:
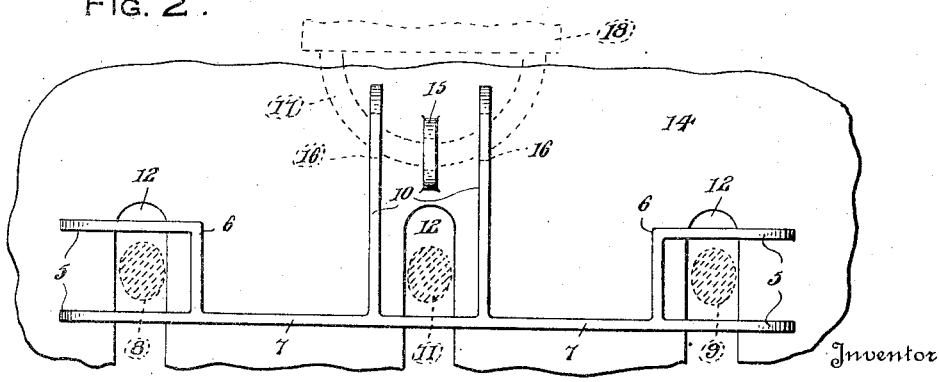

In the drawing wherein like reference characters designate corresponding parts throughout the several views, Figure 1 is a fragmentary perspective view showing a lock constructed in accordance with the present invention operatively associated with the foot levers to be locked thereby, one of the foot levers being partly omitted, and Fig. 2 is a top plan view of the lock on an enlarged scale with the foot levers and pad lock indicated by dotted lines.

Referring more in detail to the several views, the present invention embodies a pair of similar opposite and outwardly directed end forks 5 formed by providing substantially L-shaped members 6 upon the end portions of the bar 7. The forks 5 are of such dimensions and so spaced from each other as to loosely embrace the shanks of the clutch and brake levers 8 and 9 respectively when the device is operatively disposed as shown in the drawing. The bar 7 is provided with a central fork formed of forwardly extending parallel ears 10 arranged to lie at opposite sides of the shank of the reverse lever 11.

The levers 8, 9 and 11 extend upwardly through elongated slots 12 provided in the usual foot board 13 and in the sheet metal plate 14 which is rigidly fastened on said foot board, it being understood that when all of these levers are swung forwardly as shown in the drawing, the brakes are applied, reverse gears are active and the forward gears are in low speed.

The plate 14 is provided with an ear or keeper 15 adjacent the forward end of the central slot 12 whose aperture is substantially alined with the apertures 16 provided in the outer ends of the ears 10, when the device is operatively disposed upon the levers and the latter are swung to their foremost position. The shackle 17 of a pad lock 18 is then passed through the apertures of the ears 10 and through the aperture of the keeper 15 and locked so that the levers are all maintained forwardly swung and the locking member *per se* comprising the bar 7, members 6 and ears 10 is held against displacement from or off of the foot levers. The device is so proportioned as to leave sufficient room between the shanks of the foot levers and the forks so as to permit the locking member *per se* to be tilted upwardly or downwardly in removing the same from or placing the same on the levers.

It is believed that the construction and operation of the present invention as well as the advantages thereof will be readily understood and appreciated from the foregoing description.

Minor changes may be made without departing from the spirit and scope of the invention as claimed.

What I claim is:—

Means for locking the three adjacent foot levers of an automobile which control the speed gear, reverse and brakes of the latter, against relative movement, comprising similar end forks directed away from each other, an intermediate transverse fork, a web integral with and rigidly connecting the end forks and the intermediate fork whereby the end forks are positioned to embrace the shanks of the end ones of the three foot levers when the intermediate fork is positioned to embrace the shank of the intermediate foot lever, the legs of the intermediate fork being provided with alined apertures in their outer end portions adapted for reception of the shackle of a pad lock for retaining the device upon the shanks of the foot levers, a slotted sheet metal foot board plate through which said levers project, and a keeper rigidly carried by said foot board plate in position to receive the pad lock shackle when the latter is inserted through the apertures of the intermediate fork.

In testimony whereof I affix my signature.

JOSEPH MACESKA.